United States Patent [19]

Rosenquist

[11] Patent Number: 4,814,421
[45] Date of Patent: Mar. 21, 1989

[54] HYDROXY TERMINATED POLYCARBONATES

[75] Inventor: Niles R. Rosenquist, Evansville, Ind.

[73] Assignee: General Electric Company, Mt. Vernon, Ind.

[21] Appl. No.: 128,764

[22] Filed: Dec. 4, 1987

[51] Int. Cl.$^4$ ............................................. C08G 63/62
[52] U.S. Cl. .................................... 528/198; 525/394; 525/433; 525/439; 525/462; 525/537; 528/202; 528/204
[58] Field of Search ............... 528/196, 198, 204, 202; 558/268, 270

[56] References Cited

U.S. PATENT DOCUMENTS 4,269,964  5/1981  Freitag et al. ...................... 528/126
4,487,917  12/1984  Mark ................................... 528/196

*Primary Examiner*—Theodore E. Pertilla

*Attorney, Agent, or Firm*—Joseph T. Eisele; Martin B. Barancik

[57] ABSTRACT

A method for the preparation of polycarbonate resins bearing terminal hydroxy ester groups comprises the interfacial polymerization of a dihydric phenol with a carbonyl halide in the presence of a molecular weight controlling proportion of a compound of the formula:

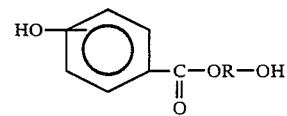

wherein R represents alkylene of 1 to about 12 carbons. The novel product resins are useful as intermediate in the preparation of copolymers with, for example, polyesteramides.

10 Claims, No Drawings

HYDROXY TERMINATED POLYCARBONATES

BACKGROUND OF THE INVENTION

1. Field of the Invention

The invention relates to polycarbonate resins and more particularly to polycarbonate resins with a polymer chain terminated by a hydroxyl group, their method of preparation and use.

2. Brief Description of the Prior Art

Although not prior art to the present invention, hydroxyl polycarbonate resins and their method of preparation are described in the now copending U.S. patent application Ser. No. 939,391 filed on Dec. 8, 1986, now U.S. Pat. No. 4,732,934, by Pyles, Longely and Hathaway. The method of preparation entails the use of a mono protected bishydroxyl compound such as shown in the formula:

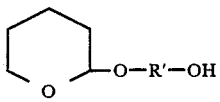

wherein R' represents alkylene or arylene, as the chain terminating agent in the preparation of the resins, followed by removal of the protecting group to generate a hydroxyl-terminated polycarbonate resin.

These hydroxy terminated resins were subsequently converted via reaction at the hydroxy group to reactive end group resins useful in polymer blend and copolymer preparation.

Other hydroxyl-terminated polycarbonates were also known prior to the present invention. However, hydroxyl group terminated polycarbonate resins are generally difficult to prepare, especially when made directly in the convenient and well known interfacial polymerization reaction. The difficulty arises because conventionally in this technique it is most convenient to react an equivalent excess of carbonyl halide with a bisphenol and a mono-functional chain terminating agent. However, to produce hydroxyl terminated resin directly in this process, the chain terminating agent would be deleted and slightly less than an equivalent of carbonyl halide would be needed. Because of difficulties of controlling carbonyl halide addition rates and of controlling its losses to side reactions and volatilization, this leads to difficulties in controlling the hydroxyl end group levels and the resin molecular weight.

The method of the present invention permits one to prepare polycarbonate resins having hydroxyl terminal groups, from an interfacial polymerization. The polymers obtained have end group structures which are useful to prepare polycarbonate copolymers with properties useful in thermoplastically molded articles.

SUMMARY OF THE INVENTION

The invention comprises a method of preparing a polycarbonate resin having polymer chains terminated with a hydroxyl group, which comprises;

reacting a dihydric phenol with a carbonyl halide under interfacial polymerization conditions, in the presence of a molecular weight controlling proportion of a compound of the formula:

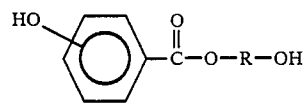

wherein R represents alkylene of 1 to about 12 carbon atoms, inclusive. The term "alkylene" is used herein to mean a divalent moiety obtained by removal of two hydrogen atoms from a parent hydrocarbon, both branched and linear, such as methylene, ethylene, propylene, butylene, pentylene, hexylene, heptylene, octylene, nonylene, decylene, undecylene, dodecylene and isomeric forms thereof. A preferred alkylene is 2,2-dimethylpropylene.

DETAILED DESCRIPTION OF THE PREFERRED EMBODIMENTS OF THE INVENTION

Polycarbonate resins and their methods of preparation by interfacial polymerization are well known; see for example the details provided in the U.S. Pat. Nos. 3,028,365; 3,334,154; 3,275,601; 3,915,926; 3,030,331; 3,169,121; 3,027,814; and 4,188,314, all of which are incorporated herein by reference thereto.

In general, the method of interfacial polymerization comprises the reaction of a dihydric phenol with a carbonyl halide (the carbonate precursor).

Although the reaction conditions of the preparitive processes may vary, several of the preferred processes typically involve dissolving or dispersing the phenol reactants in aqueous caustic, adding the resulting mixture to a suitable water immiscible solvent medium and contacting the reactants with the carbonate precursor, such as phosgene, in the presence of a suitable catalyst and under controlled pH conditions. The most commonly used water immiscible solvents include methylene chloride, 1,1-dichloroethane, chlorobenzene, toluene, and the like.

The catalyst employed accelerates the rate of polymerization of the dihydric phenol reactant with the carbonate precursor. Representative catalysts include but are not limited to tertiary amines such as triethylamine, quaternary phosphonium compounds, quaternary ammonium compounds, and the like. The preferred process for preparing polycarbonate resins of the invention comprises a phosgenation reaction. the temperature at which the phosgenation reaction proceeds may vary from below 0° C., to above 100° C. The phosgenation reaction preferably proceeds at temperatures of from room temperature (25° C.) to 50° C. Since the reaction is exothermic, the rate of phosgene addition may be used to control the reaction temperature. The amount of phosgene required will generally depend upon the movement of the dihydric phenol and the amount of any dicarboxylic acid also present.

Dihydric phenol reactants employed to prepare the polycarbonate resins of the invention are generally well known compounds as are methods of their preparation. Representative of such dihydric phenols are phenol diols of the general formula:

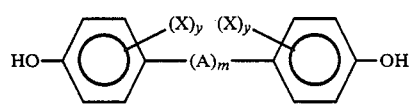

wherein A is selected from the group consisting of a divalent hydrocarbon radical containing from 1 to about 15 carbon atoms; a halogen substituted divalent hydrocarbon radical containing from 1 to about 15 carbon atoms and divalent groups such as:

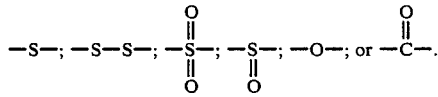

Each X in formula (II) is independently selected from the group consisting of halogen, hydrocarbyl such as an alkyl group of from 1 to about 8 carbon atoms; an aryl group of from 6-18 carbon atoms, an aralkyl group of from 7 to about 14 carbon atoms, an oxyalkyl group of from 1 to about 8 carbon atoms, and an oxyaryl group of from 6 to 19 carbon atoms; and wherein m is zero or 1 and y is a whole number integer of from 0 to 4, inclusive.

Typical of some of the dihydric phenols that are advantageously employed are bis-phenols such as bis(4-hydroxyphenyl)methane, 2,2-bis(4-hydroxy-3-methylphenyl)propane, 4,4-bis(4-hydroxyphenyl)heptane, 2,2-bis(4-hydroxy-3,5-dichlorophenyl)propane, 2,2-bis(4-hydroxy-3,5-dibromophenyl)propane; dihydric phenyl ethers such as bis(4-hydroxyphenyl)ether, bis(3,5-dichloro-4-hydroxyphenyl)ether; dihydroxydiphenols such as p,p'-dihydroxydiphenol, 3,3'-dichloro-4,4'-dihydroxydiphenyl; dihydroxyaryl sulfones such as bis(4-hydroxyphenyl)sulfone, bis(3,5-dimethyl-4-hydroxyphenyl)sulfone; dihydroxy benzenes such as resorcinol and hydroquinone, halo- and alkyl-substituted dihydroxy benzenes such as 1,4-dihydroxy-2,5-dichlorobenzene, 1,4-dihydroxy-3-methylbenzene; and dihydroxy diphenyl sulfides and sulfoxides such as bis(4-hydroxyphenyl)sulfide and bis(4-hydroxyphenyl)sulfoxide. A variety of additional dihydric phenols are also available and are disclosed in U.S. Pat. Nos. 2,999,835; 3,028,365 and 3,153,008, all of which are incorporated herein by reference. It is, of course, possible to employ two or more different dihydric phenols or a combination of a dihydric phenol with a glycol.

Preferred dihydric phenols of Formula (II) are the 4,4'-bisphenols.

The carbonate precursor employed in the preparation of resins of the present invention may be a carbonyl halide, a diarylcarbonate, or a bishaloformate. The carbonyl halides include carbonyl bromide, carbonyl chloride, and mixtures thereof. The bishaloformates include the bishaloformates of dihydric phenols such as bischloroformates of 2,3-bis(4-hydroxyphenyl)propane, hydroquinone, and the like; or the bischloroformates of glycols such as the bischloroformates of ethylene glycol, neopentylene, glycol, polyethylene glycol, and the like. Typical of the diarylcarbonates which may be employed are diphenyl carbonate, and the di(alkylphenyl)-carbonates such as di(tolyl)carbonate. Some other non-limiting illustrative examples of suitable diarylcarbonates include di(naphthyl)carbonate, phenyl tolyl carbonate, and the like.

The preferred carbonate precursors are the carbonyl halide, with carbonyl chloride, also know as phosgene, being the preferred carbonyl halide.

The term "polycarbonate" as used herein is inclusive of copolyester-polycarbonates, i.e.; resins which contain, in addition to recurring polycarbonate chain units of the formula:

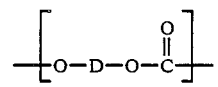

wherein D is a divalent aromatic radical of the dihydric phenol employed in the polymerization reaction, repeating or recurring carboxylate units, for example of the formula:

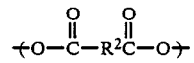

wherein $R^2$ is as defined below.

The copolyester-polycarbonate resins are also prepared by interfacial polymerization technique, well known to those skilled in the art; see from example, the U.S. Pat. Nos. 3,169,121 and 4,487,896.

In general the copolyester-polycarbonate resins are prepared as described above for the preparation of polycarbonate homopolymers, but by the added presence of a difunctional carboxylic acid (ester precursor) in the water immiscible solvent.

In general, any difunctional carboxylic acid (dicarboxylic acid) conventionally used in the preparation of linear polyesters may be utilized in the preparation of the copolyester-carbonate resins of the instant invention. Generally, the difunctional carboxylic acids which may be utilized include the aliphatic carboxylic acids, the aromatic carboxylic acids, and the aliphatic-aromatic carboxylic acids. These acids are well known and are disclosed for example in U.S. Pat. No. 3,169,121, which is hereby incorporated herein by reference. Representative of such difunctional carboxylic acids are difunctional carboxylic acids of the formula:

wherein $R^2$ is an alkylene, alkylidene, or cycloaliphatic group; an alkylene, alkylidene or cycloaliphatic group containing ethylenic unsaturation; an aromatic group such as phenylene, biphenylene, and the like; two or more aromatic groups connected through non-aromatic linkages such as alkylene or alkylidene groups; and a divalent aralkyl radical such as tolylene, xylylene, and the like. $R^1$ is either a carboxyl or a hydroxyl group. The letter q represents one where $R^1$ is a hydroxyl group and either zero or one where $R^1$ is a carboxyl group.

Preferred difunctional carboxylic acids employed are the aromatic dicarboxylic acids. Particularly useful aromatic dicarboxylic acids are those represented by the general formula:

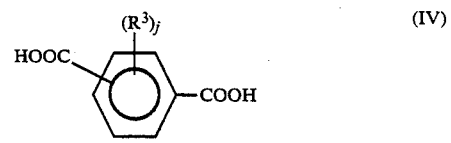

wherein j is a positive whole integer having a value of from 0 to 4 inclusive; and each $R^3$ is independently selected from the group consisting of alkyl radicals, preferably lower alkyl radicals (containing from 1 to about 5 carbon atoms).

Mixtures of these difunctional carboxylic acids may be employed as well as single acids. Therefore, where the term difunctional carboxylic acid is used herein it is to be understood that this term includes mixtures of two or more different difunctional carboxylic acids as well as individual carboxlyic acids.

Most preferred as aromatic dicarboxylic acids are isophthalic acid, terephthalic acids, and mixtures thereof. A particularly useful difunctional carboxylic acid comprises a mixture of isophthalic acid and terephthalic acid wherein the weight ratio of terephthalic acid to isophthalic acid is in the range of from about 10:1 to about 0.2:9.8.

Rather than utilizing the difunctional carboxylic acid per se, it is possible, and sometimes even preferred, to employ the reactive derivatives of said acid. Illustrative of these reactive derivatives are the acid halides. The preferred acid halides are the acid dichlorides and the acid dibromides. Thus, for example, instead of using isophthalic acid, terephthalic acid or mixtures thereof, it is possible to employ isophthaloyl dichloride, terephthaloyl dichloride, and mixtures thereof.

The proportions of reactants employed to prepare the copolyester-carbonate resins of the invention will vary in accordance with the proposed use of the product resin. Those skilled in the art are aware of useful proportions, as described in the U.S. patents referred to above. In general, the amount of the ester bonds may be from about 5 to about 90 mole percent, preferably from about 35 to about 80 mole percent, relative to the carbonate bonds. For example, 5 moles of bisphenol-A reacting completely with 4 moles of isophthaloyl dichloride and 1 mole of phosgene would give a copolyester-carbonate of 80 mole percent ester bonds.

Also included within the scope of the instant invention are randomly branched polycarbonate resins wherein a minor amount (typically between 0.05 and 2 mole percent, based on the quantity of dihydric phenol used) of a polyfunctional aromatic compound is a coreactant with the dihydric phenol in the reaction mixture, comprising also the carbonate precursor and optionally the ester precursor; to provide a thermoplastic randomly branched polycarbonate. These polyfunctional aromatic compounds may be hydroxyl, carboxyl, carboxylic anhydride, haloformyl, or mixtures thereof. Some illustrative non-limiting examples of these polyfunctional compounds include trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic acid anhydride, and the like. Other organic polyfunctional compounds useful in making randomly branched polycarbonates are disclosed in U.S. Pat. Nos. 3,635.895 and 4,001,184, both of which are incorporated herein by reference.

In the conventional interfacial polymerization methods of preparing polycarbonates, a molecular weight regulator (a chain stopper) is generally added to the reaction mixture prior to or during the contacting with a carbonate precursor. Useful molecular weight regulators include, but are not limited to, monohydric phenols such as phenol, chroman-I, paratertiarybutylphenyl, p-cumylphenol and the like. Techniques for the control of molecular weight are well known in the art and are used for controlling the molecular weight of the resins of the present invention.

The method of the present invention departs from the conventional interfacial polymerization methods for preparing polycarbonates by the use of a novel chain stopper. Employed as the sole chain stopper, or in combination with one or more of the aforementioned known chain stoppers is an ester compound of the formula (I) given above. The hydroxyl group attached directly to the phenyl ring is the hydroxyl group which reacts to end cap the resin chain, leaving the aliphatic hydroxyl unreacted and free for further reactions.

The proportion of compound (I) added to the reaction mixture may vary but is generally within the range of from 0.5 to 25 mole percent of the dihydric phenol reactant of formula (II).

The compounds of the formula (I) are generally well known as are methods of their preparation; see for example the general method described by Cavill, J. Soc. Chem. Ind., (London) 66, 175 (1947) and in the J. Organic Chem., 9, 299 (1944). In general, the compounds of formula (I) may be prepared by the esterification of hydroxybenzoic acid with an alcohol of the formula:

$$HO-R-OH \qquad (V)$$

wherein R is as defined previously.

The alcohols of the formula (V) are well known. Representative of the alcohols of the formula (V) are ethylene glycol, propylene glycol, butylene glycol, 2,2-dimethylpropylene glycol and the like.

Those skilled in the art will appreciate from the description given above, that the polycarbonate resins of the present invention may be represented by the schematic formula:

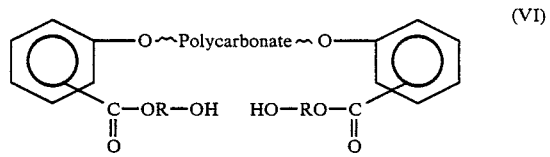

(VI)

wherein R has the meaning previously ascribed to it. The end-capped polycarbonate resins of the formula (VI) are useful intermediates for the preparation of polycarbonate block copolymers, with reactive polymers such as polyesters, polyester-amides, polyphenylene sulfides, polyphenylene ethers and the like.

The polycarbonate resins of the invention described above may have a weight average molecular weight of from about 10,000 to about 200,000, preferably from about 30,000 to about 150,000 and an intrinsic viscosity, as measured in methylene chloride at 25° C., of at least about 0.3 dl/gm, preferably from about 0.45 to about 1.40 dl/gm.

The following examples and preparations describe the manner and process of making and using the invention and set forth the best mode contemplated by the inventor of carrying out the invention but are not to be construed as limiting the invention. where reported, the following tests were carried out:

INTRINSIC VISCOSITY

The intrinsic viscosity was measured at a temperature of 25° C. in methylene chloride and is reported in deciliters/gram (dl/g).

EXAMPLE 1

A 1000 ml, four neck flask fitted with a mechanical stirrer, a pH probe, an aqueous caustic inlet tube and a Claisen adapter to which there is attached a dry ice condenser and a gas inlet tube, is charged with 280 ml water, 350 ml methylene chloride, 1.4 ml trietheylamine (0.01 mole), 57 g (0.25 mole) bisphenol-A, 1.48 g (0.0081 moles, 3.24 mole %) of 2-hydroxyethyl-4-hydroxybenzoate. With stirring, phosgene is introduced into the flask at a rate of 1 g/min. for 30 minutes with the pH maintained in a range of 10.0 to 11.0 by addition of 25% aqueous sodium hydroxide. The pH is then adjusted to 11. The resin layer is then separated from the brine layer, washed with 3 wt. percent aqueous HCl until washing remains acidic, then twice with distilled water. The resin is then precipitated into 1600 ml. of methanol in a Waring blender and washed with 500 ml more of methanol.

The polycarbonate resin obtained exhibited an intrinsic viscosity of 0.502. This intrinsic viscosity is essentially the same as that obtained when the same molar level of a conventional mono functional phenol (e.g. phenol, t-butylphenol) is used as an endcapping agent, indicating that the 2-hydroxyethyl-4-hydroxy benzoate reacted only at the phenolic hydroxy position. The resin was further characterized by infrared analysis, where it exhibited an absorption at 3500 cm$^{-1}$, characteristic of an aliphatic hydroxy group. This peak is absent in polycarbonate resin prepared using a conventional monofunctional phenol as an endcapping agent.

The resin so obtained may be used in the preparation of functionalized polycarbonate resins and of block copolymers with a wide variety of reactive thermoplastic polymers (for example polyamides, polyester, polyurethanes and the like).

What is claimed is:

1. A method of preparing a hydroxy ester group chain-terminated, aromatic polycarbonate resin, which comprises;

reacting a dihydric phenol with a carbonyl halide under interfacial polymerization conditions, in the presence of a molecular weight controlling proportion of a compound of the formula:

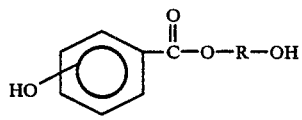 (I)

wherein R represents alkylene of 1 to about 12 carbon atoms, inclusive.

2. The method of claim 1 wherein the dihydric phenol is selected from those of the formula:

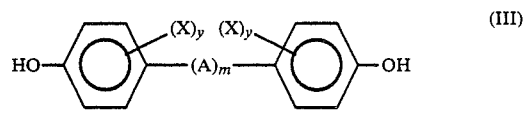 (III)

wherein A is selected from the group consisting of a divalent hydrocarbon radical containing from 1 to about 15 carbon atoms; a halogen substituted divalent hydrocarbon radical containing from 1 to about 15 carbon atoms and divalent groups such as:

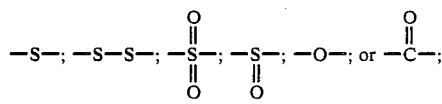

wherein each X in formula (III) is independently selected from the group consisting of a halogen, hydrocarbyl, oxyalkyl or oxyaryl and wherein m is zero or 1 and y is a whole number integer of from 0 to 4, inclusive.

3. The method of claim 2 wherein the carbonyl halide is phosgene.

4. The method of claim 1 wherein R represents ethylene.

5. The method of claim 1 wherein R is a branched alkylene

6. An aromatic polycarbonate resin end-capped with a monovalent moiety of the formula:

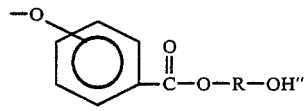

wherein R represents alkylene of 1 to about 12 carbon atoms, inclusive.

7. The resin of claim 6 wherein R represents branched alkylene.

8. The resin of claim 6 wherein R represents ethylene.

9. The resin of claim 7 wherein R represents 2,2-dimethylpropylene.

10. An aromatic polycarbonate of the formula

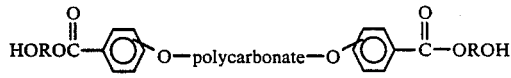

wherein R is alkylene of one to about twelve carbon atoms, inclusive.

UNITED STATES PATENT AND TRADEMARK OFFICE
CERTIFICATE OF CORRECTION

PATENT NO. : 4,814,421

DATED : March 21, 1989

INVENTOR(S) : Niles Richard Rosenquist

It is certified that error appears in the above-identified patent and that said Letters Patent is hereby corrected as shown below:

Col. 2, line 32, "phenol" should read --diphenol--

Col. 2, line 56, "movement" should read --amount--

Col. 2, line 61, "phenol" should read --phenolic--

Signed and Sealed this

Thirty-first Day of July, 1990

Attest:

Attesting Officer

HARRY F. MANBECK, JR.

Commissioner of Patents and Trademarks